United States Patent Office 3,194,749
Patented July 13, 1965

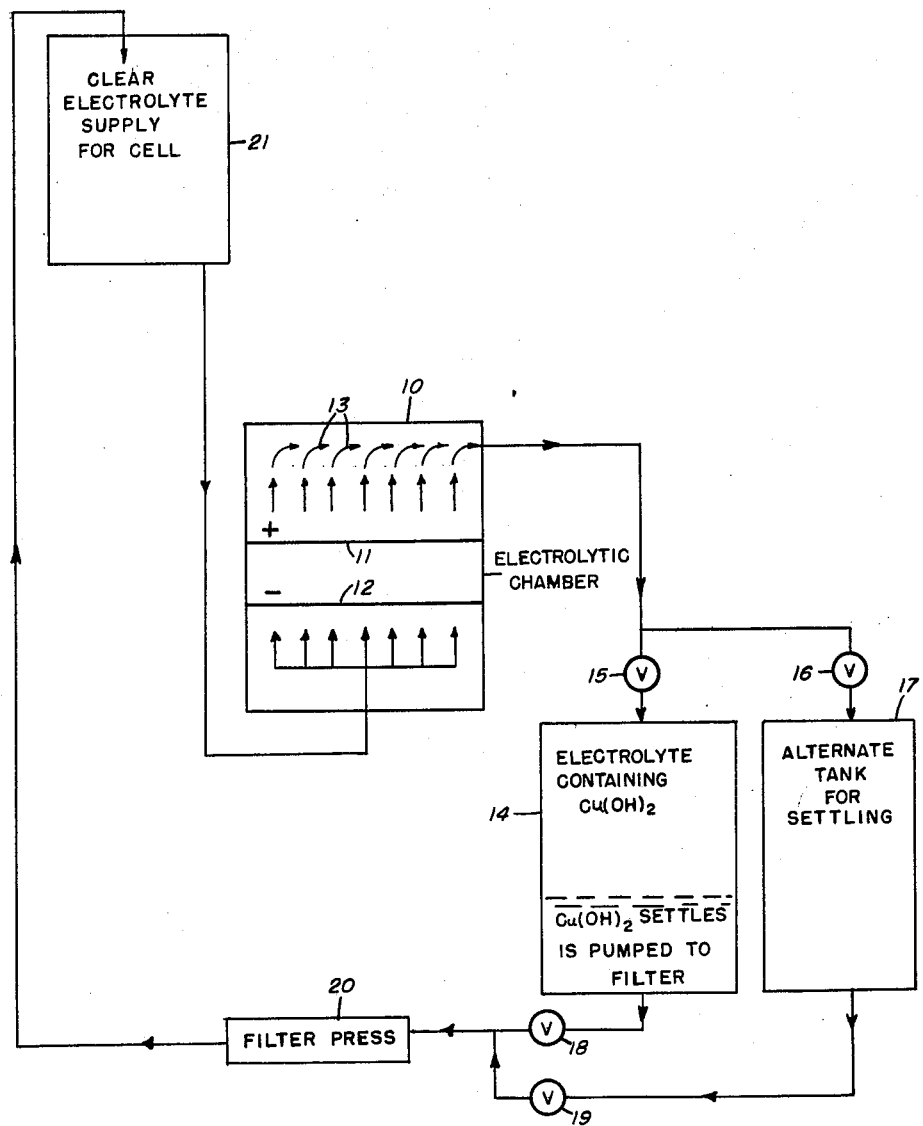

3,194,749
ELECTROLYTIC METHOD OF MAKING
CUPRIC HYDROXIDE
William H. Furness, Haddonfield, N.J.; Mary A. Furness, executrix of said William H. Furness, deceased, assignor to Kennecott Copper Corporation, New York, N.Y., a corporation of New York
Filed Dec. 9, 1960, Ser. No. 74,809
5 Claims. (Cl. 204—96)

This invention relates to a method of making a stable form of cupric hydroxide by means of the electrolytic dissolution of a copper anode in the presence of an electrolyte solution of sodium sulfate and trisodium phosphate. The present invention constitutes an improvement on the process disclosed and claimed in U.S. Patent Re. 24,324, to the present applicant.

It is known that stable, separable cupric hydroxide cannot be made by direct reaction between copper sulfate and sodium hydroxide. The combination of these two chemicals results in the formation of a gelatinous, inseparable sludge of blue cupric hydroxide which changes rapidly to black cupric oxide. Other methods of producing cupric hydroxide, such as the treatment of copper metal or cuprous hydroxide in ammonia water by blowing with air, the aeration of copper oxychloride or the conversion of tribasic sulfate, oxychloride, tetra-ammonium sulfate, tetra-ammonium carbonate, and similar compounds with caustic soda, are likewise unsatisfactory since the products obtained by all these methods lack predictable stability.

Moreover, cupric hydroxide produced by the processes of the prior art has been unsatisfactory in other respects. The activity of cupric hydroxide, for example, when used as a fungicide increases as the particle size decreases. Some processes produce cupric hydroxide which is relatively stable but the particle size is quite large. Cupric hydroxide obtained by other processes is in a colloidal, fine particle state but it is impossible to remove all or substantially all of the water. For example, Emile Carriere in an article entitled "L'utilisation Rationnelle due Cuivre pour la Preparation des Bouillies Cupriques" (Chimie et Industrie, vol. 49, pages 135 to 136, 1943), describes a process for the electrolytic preparation of cupric hydrate. The product obtained by this process after filtration and drying consists of 10 to 15 percent copper and 85 to 90 percent of water. The cupric hydroxide obtained by this process will, upon exposure to the atmosphere, be converted to cupric oxide and hence is subject to those disadvantages previously mentioned.

U.S. Patent 2,169,576 and U.S. Patent 2,237,045 to Booth et al., describe the electrolytic production of a copper phosphate-sodium phosphate complex having the formula $3Cu_3(PO_4)_2 \cdot 2Na_2HPO_4 \cdot XH_2O$ (where X is about 6) by the electrolysis of a solution of $Na_2SO_4$, $Na_2HPO_4$ and $NaH_2PO_4$ in the presence of a copper anode. The product obtained by the process of that patent does not meet the need for a substantially pure, stable form of cupric hydroxide since the cupric hydroxide content of the complex molecule is relatively small.

Reissue Patent 24,324, to the present applicant discloses and claims a process for making a stable cupric hydroxide of fine particle size and readily separable from water. The process described in that patent comprises the steps of reacting cupric sulfate in an aqueous medium with sufficient trisodium phosphate to precipitate the copper in the cupric sulfate as copper sodium phosphate and adding sufficient sodium hydroxide to convert the copper sodium phosphate to cupric hydroxide. In operation, this process is usually carried out by making successive alternate additions of cupric sulfate and sodium hydroxide to the reaction mixture. When the reaction vessel becomes full, the process is interrupted and the supernatant liquid containing sodium sulfate as a by-product of the reaction is drawn off. In this process, one mole of cupric sulfate and two moles of sodium hydroxide are consumed in the production of one mole of cupric hydroxide.

It is an object of this invention to provide a process for making a stable form of cupric hydroxide in a continuous manner. It is a further object of this invention to provide a process for directly converting copper scrap metal to a stable form of cupric hydroxide. It is another object of this invention to produce a stable, finely divided form of cupric hydroxide which is extremely valuable for use as a fungicide and in anti-fouling marine paints.

Briefly, the objects of this invention are attained by passing a direct current through an electrolyte solution, preferably an aqueous solution, containing sodium sulfate and trisodium phosphate in the presence of a copper anode. The concentration of sodium sulfate in the electrolyte is not critical except such as to provide ample conductivity and sufficient sulfate ions to oxidize the copper anode to copper sulfate. The trisodium phosphate is present in sufficient quantity to react with the copper sulfate as it is formed to yield an insoluble copper compound which is converted to cupric hydroxide by the sodium hydroxide formed at the cathode. It is preferred to use from about 80 to about 125 grams of sodium sulfate ($Na_2SO_4 \cdot 10H_2O$) per liter of solution and from about 20 to about 35 grams of trisodium phosphate $$(Na_3PO_4 \cdot 12H_2O)$$

per liter of solution. The pH of the electrolyte solution should be maintained at above about 9.0. The temperature of the solution should not be allowed to exceed 50° C., and it is preferably maintained at a temperature below 50° C.

The cupric hydroxide produced in the electrolytic cell as described herein may be recovered conveniently from the electrolytic cell by filtration of the electrolyte. Any residual alkalinity in the filter cake of $Cu(OH)_2$ should be removed by washing as with ordinary tap water. Sufficient washing of the filter cake is indicated by the pH of the wash water being about 7.5 or lower after it has passed through the cake. There is thus obtained a very finely divided blue precipitate of cupric hydroxide in a highly stable form. The particle size of the product ranges from 0.01 to 1.0 micron in diameter. The specific gravity of the product when dried is about 3.3 to 3.36. This stable form of finely divided cupric hydroxide may contain minor amounts of chemically bound or adsorbed phosphate and sulfate. Typical analyses of the product after washing and drying demonstrate that it contains from 55.0 to 60.0 percent by weight of copper, from about 2 to about 4 percent by weight of phosphate calculated as $PO_4$, up to about 2 percent by weight of sulfate calculated as $SO_4$ and no more than 4.0 percent by weight of free water when air-dried. The presence of this small amount of phosphate is believed to have the effect of stabilizing the material. Thus, instead of being rapidly transformed to cupric oxide, this stable form of cupric hydroxide may be stored in air at normal room temperatures for at least several months without any conversion to cupric oxide occurring. Similarly, it may be stored under water for more than two years without any deleterious effects.

The cupric hydroxide made in accordance with this invention has the added advantage of precipitating in the form of acicular aggregates most of which are not larger than 1.0 micron in diameter. The primary particles which are initially formed in the cell and make up the aggregates, are about 0.01 micron in diameter. These aggregates settle to the bottom of the cell often in the form of visible clumps and may be removed by filtration. The visible clumps as distinguished from the aggregates, may be readily broken down physically into smaller clumps.

In the practice of this invention, ordinary copper scrap metal may be used as the anode. It is preferred that the copper used be relatively pure since the presence of substantial amounts of impurities may result in the formation of contaminating by-products or in fouling of the cathode. The cathode may be formed of any conducting material which is not readily attacked by NaOH such as iron, carbon, copper, etc.

In operation, a direct current of electricity is passed through the electrolyte solution between the anode and the cathode. The voltage and amperage applied are not critical and will depend on the nature of the cell, such as the concentration of the electrolyte, the distance between the electrodes, the surface area of the electrodes, etc. It is preferred that the electrodes be positioned as closely together as reasonably possible without having them in contact in actual operation so that the resistance of the cell and hence, the required voltage, may be held to a minimum. Practical electrode spacings of from about two to about three inches are contemplated. For obvious economic reasons, the voltage impressed upon the cell should be only slightly greater than that required to overcome the resistance of the cell. Thus, a voltage of from about 2.5 volts to about 3 volts is conveniently employed in carrying out the invention. When the voltage used is 6 volts or less, the cell may be arranged to have the lowest resistance resulting from electrolyte composition and practicable electrode placement. Then, maximum current density at the electrodes will not have a deleterious effect on the resulting product. Current densities of from about 15 amperes per square foot to about 20 amperes per square foot at either the cathode or the anode are preferred.

During the electrolytic process of this invention $SO_4$ ions are freed at the anode which unite with the copper to form copper sulfate. At the same time sodium, which decomposes water to form sodium hydroxide and hydrogen, is being generated at the cathode. It is believed that the copper sulfate reacts with the trisodium phosphate to form copper sodium phosphate which in turn reacts with the sodium hydroxide to form cupric hydroxide and trisodium phosphate. The sodium sulfate and trisodium phosphate are thus regenerated. Operation of the process over a long period of time, however, may result in some change of the composition of the electrolyte, whereupon, adjustments may be necessary to restore the electrolyte to substantially its original composition.

Since cupric sulfate is formed at the anode and sodium hydroxide is formed at the cathode, it is preferred that the electrolytic solution be circulated in order to insure proper reaction between the sodium hydroxide, copper sulfate and trisodium phosphate. This may be accomplished by causing the electrolyte to flow through the cell and into a collecting tank where the precipitate is removed and the electrolyte is recirculated through the cell. The preferred direction of flow is from the cathode to the anode which flow is assisted by the evolution of the hydrogen gas at the cathode.

The aspects of this invention that are capable of illustration are shown in the accompanying drawing. The drawing is a flow diagram which illustrates the process of this invention.

Referring more particularly to the drawing there is shown an electrolytic chamber 10 which is kept continuously filled with an electrolyte solution of sodium sulfate and trisodium phosphate of concentrations as hereinafter described. An anode 11 of copper scrap and a cathode 12 which is a copper screen, are located within the chamber 10 in close proximity to each other. In operation, a direct current of electricity is caused to pass between the cathode and the anode. Hydrogen gas is evolved at the cathode which sweeps past the anode thereby causing circulation of the electrolyte solution in the direction of the arrows 13. The reaction liquor, containing regenerated sodium sulphate and trisodium phosphate and primary particles of cupric hydroxide, is drawn off at the top of the chamber 10 and taken to the settling tank 14. In the settling tank, the aggregates of $Cu(OH)_2$ settle to the bottom of the tank. When the settling tank 14 becomes filled, the valve 15 is closed and the valve 16 is opened so that the liquor from the chamber 10 will flow into the alternate settling tank 17. Then the valve 18 at the bottom of the settling tank 14 is opened, valve 19 being closed, and the contents of the tank are put through a filter press 20. Here, the cupric hydroxide aggregates are collected by filtration and the filtrate is sent to the storage tank 21. Fresh electrolyte solution may be added as needed to this tank to replace any electrolyte which may have been lost during the process. The electrolyte solution is returned from the storage tank 21 to the electrolytic chamber 10, the solution circulating upwards through the cathode screen, and the process is repeated continuously.

The following example illustrates the invention and sets for the best mode contemplated for carrying out the same:

*Example I*

An aqueous electrolyte solution consisting of 100 grams per liter of sodium sulfate ($Na_2SO_4.10H_2O$) and 25 grams per liter of trisodium phosphate ($Na_3PO_4.12H_2O$) was placed in an electrolysis chamber of the type shown in FIGURE 1. The anode was copper scrap metal and the cathode was a copper screen. The electrodes were positioned at a distance of 2 inches from each other. A direct current of electricity at 3 volts was caused to pass between the cathode and the anode. The current density at the cathode was maintained at 15 amperes per square foot of cathode surface area. The temperature of the electrolyte solution was not allowed to exceed 50° C. Hydrogen gas evolved at the cathode bubbled up through the solution causing circulation of the electrolyte solution. Supernatant liquor was drawn off at the top of the chamber and passed to a settling tank. Aggregates of cupric hydroxide settled to the bottom. When the tank was full and the cupric hydroxide aggregates had settled to the bottom of the tank, the contents of the tank were withdrawn. The electrolyte solution was removed from the precipitated aggregates by means of filtration and was then taken to a storage tank from which it was returned to the electrolytic chamber.

The filter cake which comprised cupric hydroxide was washed with tap water until the pH of the wash water was 7.5. The washed cake was then air dried.

The product was a very finely divided (average particle size was about 0.1 micron in diameter) blue powder. It was very stable and did not show any signs of conversion to cupric oxide after having been stored for over a year. The product possessed a much higher degree of activity when used as a fungicide than several commercially available preparations of cupric hydroxide. It was also extremely valuable when used in an anti-fouling marine paint.

In the above example, 27 ampere-hours of electricity were required to convert 31.5 gm. of copper to copper hydroxide. This is about 97,200 coulombs per equivalent weight of copper.

The electrolyte solution described herein may contain materials other than sodium sulfate and trisodium phosphate that will not deleteriously affect the process of the invention or the resulting product. For example, small amounts of a non-ionic surface active agent added to the electrolyte are useful to prevent fouling of the electrodes in the process. Suitable non-ionic surface active agents for this purpose include ethylene oxide condensation reaction products of long chain organic alcohols, substituted phenols and long chain carboxylic acids. Illustratively, 0.2% by weight of oleyl alcohol condensed with fifteen moles of ethylene oxide per mole of alcohol, the percentage by weight of reaction product being based on the weight of water in the electrolyte, was dissolved in the electrolyte described in Example I herein, and the process was carried out as in that example.

The foregoing examples and description of the invention are not to be construed as limiting my invention except as it is defined in the appended claims.

I claim:
1. A process for the electrolytic production of finely divided stable cupric hydroxide which comprises passing a direct current of electricity through an electrolyte between a copper anode and an inert cathode, said electrolyte consisting essentially of an aqueous solution of from about 80 to about 125 grams per liter of sodium sulfate ($Na_2SO_4 \cdot 10H_2O$) and from about 20 to about 35 grams per liter of trisodium phosphate ($Na_3PO_4 \cdot 12H_2O$), said electrolyte having a pH above about 9.0 and being circulated between said anode and said cathode by evolution of hydrogen gas from the cathode.
2. The process of claim 1 wherein said electrolyte contains about 100 grams per liter of sodium sulfate ($Na_2SO_4 \cdot 10H_2O$) and about 25 grams per liter of trisodium phosphate ($Na_3PO_4.12H_2O$).
3. The process of claim 1 wherein the temperature of the electrolyte is maintained at less than about 50° C.
4. The process of claim 2 wherein the temperature of the electrolyte is maintained at less than about 50° C.
5. The process of claim 1 wherein cupric hydroxide is separated from said electrolyte, washed with water and dried to contain not more than 4.0 percent by weight of free water.

References Cited by the Examiner
UNITED STATES PATENTS

Re. 24,324  5/57  Furness _____ 23—147
2,169,576  8/39  Booth _____ 204—90

OTHER REFERENCES

Ser. No. 231,799, Munekata (A.P.C.), published May 18, 1943.

JOHN H. MACK, *Primary Examiner.*

JOHN R. SPECK, WINSTON A. DOUGLAS, *Examiners.*